United States Patent
Kami et al.

(10) Patent No.: US 6,283,507 B1
(45) Date of Patent: Sep. 4, 2001

(54) LIGHTWEIGHT AIR BAG

(75) Inventors: Yoshinori Kami, Tokyo; Tadao Kanuma, Fujinomiya, both of (JP)

(73) Assignees: Asahi Kasei Kogyo Kabushiki Kaisha, Osaka; Nihon Plast Co., Ltd., Fuji, both of (JP)

( * ) Notice: Subject to any disclaimer, the term of this patent is extended or adjusted under 35 U.S.C. 154(b) by 0 days.

(21) Appl. No.: 09/530,920

(22) PCT Filed: Nov. 30, 1998

(86) PCT No.: PCT/JP98/05364

§ 371 Date: May 5, 2000

§ 102(e) Date: May 5, 2000

(87) PCT Pub. No.: WO99/28164

PCT Pub. Date: Jun. 10, 1999

(30) Foreign Application Priority Data

Nov. 28, 1997 (JP) .................................................. 9-328058

(51) Int. Cl.$^7$ .................................................. B60R 21/16
(52) U.S. Cl. ..................... 280/743.1; 280/743.2; 442/203; 139/389
(58) Field of Search ............................. 280/728.1, 743.1, 280/743.2; 442/203; 139/389

(56) References Cited

U.S. PATENT DOCUMENTS

| | | | |
|---|---|---|---|
| 5,215,795 | * 6/1993 | Matsumoto et al. | 428/36.1 |
| 5,296,278 | * 3/1994 | Nishimura et al. | 428/36.1 |
| 5,441,798 | * 8/1995 | Nishimura et al. | 442/205 |
| 5,482,317 | 1/1996 | Nelsen et al. . | |
| 5,554,424 | * 9/1996 | Krummheuer et al. | 428/35.2 |
| 5,685,347 | * 11/1997 | Graham et al. | 139/390 |
| 5,902,672 | * 5/1999 | Swoboda et al. | 139/383 R |

FOREIGN PATENT DOCUMENTS

| | | |
|---|---|---|
| 3-137245 | 6/1991 | (JP) . |
| 9-302549 | * 11/1997 | (JP) . |
| 10-194063 | 7/1998 | (JP) . |

\* cited by examiner

*Primary Examiner*—Paul N. Dickson
(74) *Attorney, Agent, or Firm*—Flynn, Thiel, Boutell & Tanis, P.C.

(57) ABSTRACT

An object is to provide an air bag to protect passengers during collisions, which is lighter and can be compactly accommodated, which is sufficiently airtight, and which has durable strength in the sewn parts. The invention relates to a lightweight air bag, wherein the air bag main body is constituted of a base fabric composed of a woven fabric which has been made using a raw yarn of less than 150 denier and a cover factor of 2100 or more or a basis weight of 140 g/m$^2$ or less, and the air bag main body is preferably constituted of a base fabric having 10 g/m$^2$ or less of a heat resistant elastomer applied thereon, at least part of the sewn areas relating to the air bag main body, particularly where a reinforcing fabric is sewn around the inflator fitting hole, being sewn with a sewing thread having a specific yarn number count T and stitch number S (stitches/centimeter), as indicated by the following Formulas:

$$10 < T \leq 60 \quad (1A)$$

$$2 \leq T/S \leq 8 \quad (1B)(1).$$

16 Claims, 5 Drawing Sheets

(1)

FLAP (2)

LIGHTWEIGHT AIR BAG

TECHNICAL FIELD

The present invention relates to an air bag for protecting passengers during automobile collisions, and more particularly to an air bag which is lightweight and can be accommodated more compactly.

BACKGROUND ART

Air bag systems have become more common recently as safety devices for the protection of passengers, and are being used in more locations, not only for a driver but also for passengers, for protection against side collisions (side bags), and for rear seat occupant protection.

With the increase in the locations and number of air bags mounted has come the need to make air bag systems more lightweight and compact, and the various components of the system are now being designed with the intention of achieving a more compact size and lighter weight. The bag bodies of such air bags are also being made lighter in weight by being left uncoated, by reducing the bag volume, and the like.

The inflators that produce the gas for deploying air bags also need to be made more compact and lightweight as set forth in air bags. The base cloth of air bags must have extremely high airtightness in order to reduce the volume of the gas-generating agent accommodated therein and to make more effective use of lower amounts of gas-generating agents. Uncoated base fabrics used for air bag main bodies must thus have a higher weaving density than conventionally used industrial woven fabrics in order to increase air tightness, that is, to reduce air permeability, but this tends to result in stiffer and heavier woven fabric.

The use of finer yarn to reduce the weight of the woven fabric forming the air bag body has been studied in order to achieve a more lightweight bag while circumventing the drawbacks noted above. That is, practical use has been made of air bags constructed of a woven fabric using yarn of 420 denier, which is finer than the conventionally used 840 denier yarn, and uncoated woven fabric for air bags using a raw yarn of 300 to 400 decitex (270 to 360 denier) has been proposed in Japanese Patent Application Publication (Kokai) H3-137245. However, when woven fabrics made using such a fine denier are used as uncoated bags, they must be made into high density woven fabrics in order to reduce the air permeability, not only resulting in extremely stiff material, but also lowering the mechanical properties of the woven fabric itself, such as the tear strength, while failing to produce significant results in terms of a more lightweight and more compact bag. Proposals have also been made to use a finer raw yarn of smaller denier to produce an extremely light woven fabric in order to make an air bag lighter in weight. U.S. Pat. No. 5,482,317 discloses an air bag featuring the use of a woven fabric obtained using nylon 66 with a denier ranging from 45 to 140. These woven fabrics have a basis weight which is half, or even less, that of conventional air bag woven fabrics and the weight-reducing level exceeds the conventional level. However, the mechanical properties of the woven fabric itself are less satisfactory than those of conventional air bag woven fabrics, and the outer periphery of the air bag of the aforementioned invention is made in the form of a rectangle, while the outer periphery is also seamless in an effort to ensure that the bag body has adequate pressure resistance. However, the rectangular bag forms four corners when deployed, and the effects of the corners on passengers and the like must be taken into consideration. In this patent, the failure to ensure the strength of the inflator fitting hole, which is where the greatest collision force occurs during deployment, results in the risk of unsatisfactory mechanical properties in terms of practical performance.

On the other hand, some of the more compact inflators described above increase the temperature of the gas that is generated due to the internal structure, the ignition properties of the gas-generating agent, and the like.

Efforts have thus been made to study coating processes for providing woven fabrics made of finer yarn with heat resistance.

Japanese Patent Application Publication (Kokai) H10-194063, for example, proposes improving the mechanical properties of, and providing heat resistance to, a woven fabric made of relatively fine yarn by using silicone rubber in an amount of 30 to 50 g/m$^2$ to coat the surface of woven fabric made from 300 to 400 denier yarn and having a cover factor of 1500 to 2500.

Japanese Patent Application Publication (Kokai) H4-352843 proposes an air bag base fabric comprising applying a rubber resin layer of 10 to 90 g/m$^2$ on at least one side of a woven fabric which has a cover factor of 1000 to 2000 and made of 100 to 500 denier yarn, with a strength of 15 g/d or more, which is at least 50% higher than the strength of conventionally used yarn. In the latter technique, high strength yarn is used to compensate for the insufficient strength of the woven fabric made of fine yarn, and the woven fabric is coated with relatively large amounts of a coating material to ensure airtightness and heat resistance. However, these inventions both relate to air bag base fabrics, with no suggestion of the method for producing an air bag for practical use. Despite the use of a fine yarn and the reduction in the weight of the woven fabric, the use of relatively large amounts of a coating material makes it impossible to obtain a lightweight air bag which can be compactly accommodated as intended in the present invention.

DISCLOSURE OF THE INVENTION

A first object of the present invention is to provide an air bag which is lighter and can be accommodated more compactly than conventional air bags, and which has a more durable bag body structure, particularly a sturdy fitting hole. A second object of the present invention is to provide an air bag which allows the gas discharged from the inflator to be effectively used in deploying the air bag, and which has better heat resistance against the hot gas from the inflator.

As a result of extensive research on a sewing method for making practical use of an air bag out of a thin woven fabric having a specific woven fabric structure using fine yarn, the inventor achieved the first object by using specific sewing conditions.

Further, the second object could be achieved by using an air bag base fabric on which a heat resistant elastomer is applied in an extremely low amount in combination with specific sewing conditions.

That is, the present invention relates to:

(I) a lightweight air bag composed of a plurality of members sewn together, the main body of the air bag constituted of a woven fabric which has been made using a raw yarn of less than 150 denier and has a cover factor of 2100 or more, at least part of the sewn areas relating to the air bag main body being sewn under conditions where the yarn number count T of a sewing thread and the stitch number S (stitches/centimeter) comply with the following Formulas (1) {Formulas (1A) and (1B)}:

$$10 < T \leq 60 \quad (1A)$$

$$2 \leq T/S \leq 8. \quad (1B)(1)$$

(II) a lightweight air bag composed of a plurality of members sewn together, the main body of the air bag constituted of a woven fabric which has been made using a raw yarn having less than 150 denier and has a basis weight of 140 g/m² or less, at least part of the sewn areas relating to the air bag main body being sewn under conditions where the yarn number count T of a sewing thread and the stitch number S (stitches/centimeter) comply with the following Formulas (2) {Formulas (2A) and (2B)}:

$$20 \leq T \leq 60 \quad (2A)$$

$$2 \leq T/S \leq 8. \quad (2B)(2)$$

(III) the lightweight air bag according to (II) above, in which the air bag main body is composed of a woven fabric having a cover factor of 2100 or more;

(IV) the lightweight air bag according to any one of (I) through (III) above, in which the air bag is formed by sewing the peripheral edges of opposing base fabrics together so as to form a bag body, the sewing conditions for the peripheral edges of the air bag being such that the edges are sewn together in such a way as to comply with Formula (1) or Formula (2);

(V) the lightweight air bag according to any one of (I) through (III) above, comprising an inflator fitting hole, and a reinforcing fabric being sewn around the periphery thereof in such a way as to comply with Formula (1) or Formula (2);

(VI) the lightweight air bag according to any one of (I) through (III) above, comprising a vent hole, and a reinforcing fabric being sewn around the periphery thereof in such a way as to comply with Formula (1) or Formula (2);

(VII) the lightweight air bag according to any one of (I) through (III) above, comprising a tether belt, the tether belt being sewn to the air bag base fabric in such a way as to comply with Formula (1) or Formula (2);

(VIII) the lightweight air bag according to any one of (I) through (III) above, comprising a tether belt, the tether belt being sewn to the bag body with the aid of an auxiliary fabric, the auxiliary fabric being sewn to the air bag base fabric in such a way as to comply with Formula (1) or Formula (2);

(IX) the lightweight air bag according to (V) above, wherein the reinforcing fabric is sewn around the periphery of the inflator fitting hole of the bag body such that the woven fabrics forming the bag body and the reinforcing fabric secured around the periphery of the inflator fitting hole are superposed on each other and sewn together, with their yarn axes of the respective fabrics oriented in the same direction, and an opening for securing the inflator is provided on the yarn axis of the reinforcing fabric passing through the center of the inflator fitting hole or on a line parallel to the aforementioned yarn axis; and (X) the lightweight air bag according to any one of (I), (II), (III) and (IX) above, wherein a heat resistant elastomer is provided in an amount of no more than 10 g/m² on the woven fabric forming the main body of the air bag.

BEST MODE FOR CARRYING OUT THE INVENTION

Figure 1:
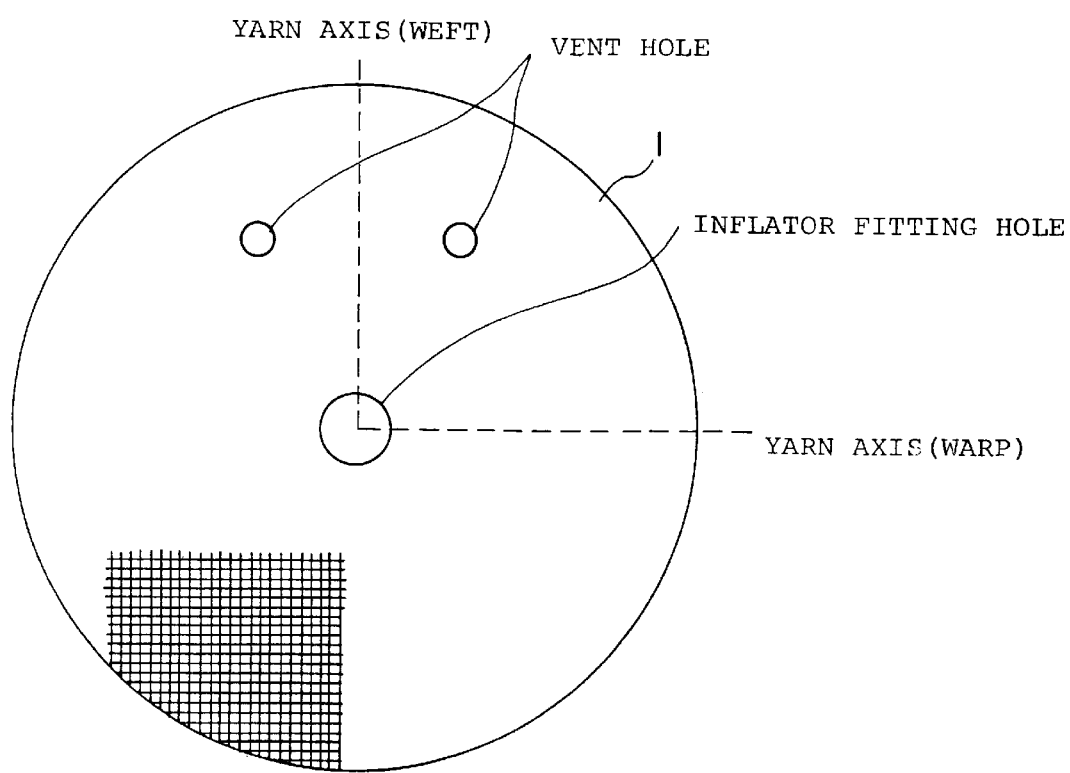
FIG. 1 is an illustration depicting an example of circular fabric provided with an inflator fitting hole constituting a portion of the bag body of the air bag.

The air bag of the present invention is formed out of a high density woven fabric with a cover factor of 2100 or more, obtained using a fine yarn of less than 150 denier. The finer the yarn that is used, the thinner and lighter the woven fabric that is obtained, but yarn that is too fine will result in a woven fabric with unsatisfactory mechanical properties, and the resulting air bag will not be suitable for practical use, even when the sewing conditions of the present invention are applied. Accordingly, the yarn of the present invention should have a finess of less than 150 denier, preferably a finess of at least 60 denier and less than 150 denier, and ideally at least 100 denier and less than 150 denier. The use of yarn of at least 150 denier will not allow the target air bag to be made sufficiently light or compact.

The woven fabric must have a cover factor of 2100 or more, preferably in the range of 2200 to 2600, and even more preferably in the range of 2250 to 2600.

As used herein, the cover factor (CF) of the woven fabric is an index of the density of the woven fabric structure, and is determined on the basis of the warp and weft yarn deniers (Dw and Df) df the woven fabric, and on the warp and weft densities (Nw and Nf) of the woven fabric.

$$CF = \sqrt{Dw} \times Nw + \sqrt{Df} \times Nf$$

Although a cover factor of less than 2100 will result in a lighter woven fabric, the mechanical properties such as the tensile strength will be unsatisfactory, and so will the air bag airtightness. A cover factor of 2600 or more will result in a rough and stiff woven fabric, and conversely will result in a loss of mechanical properties such as tear strength, as well as in a heavier woven fabric.

The woven fabric in the present invention should have a basis weight of no more than 140 g/m², preferably between 80 and 140 g/m², and even more preferably between 100 and 140 g/m². A basis weight of more than 140 g/m² will not allow a sufficient light weight or compactness to be achieved as intended in the present invention.

A woven fabric provided with no more than 10 g/m² heat resistant elastomer may also be used in the present invention. Such a fabric may be used when higher airtightness is needed, such as in side bags for protection against side collisions, or when a coated air bag can provide more satisfactory properties required of air bags, depending on properties such as the output of the inflator that is used, the gas temperature, and so on.

Coating processes and the like have been used in the past to increase the airtightness and heat resistance of air bag base fabrics, but the woven fabric to which the coating is applied has a low to medium weaving density with a cover factor of 2000 or less, while most coatings or resins are applied in an amount between 20 and 100 g/m², resulting in a base fabric that is heavier and thicker.

In the present invention, the use of a woven fabric that has been woven with fine yarn at a high density allows a base fabric with low air permeability to be obtained without the use of means such as resin coating, but furthermore providing a heat resistant elastomer in an extremely low amount of 10 g/m² or less, preferably between 2 and 8 g/m², makes it possible to achieve air impermeability and heat resistance similar to that of conventional coated base fabrics. The low amount of heat resistant elastomer will also effectively improve the mechanical properties of the high density woven fabric of fine yarn, particularly the tear strength. An amount of 10 g/m² or more is sufficient to improve the airtightness and mechanical properties of the base fabric, but is undesirable in terms of making the air bag lighter in weight and compact.

In the present invention, it is extremely important to manufacture the air bag under specific sewing conditions from a light, thin woven fabric which has been woven at a high density using fine yarn.

That is, the sewing conditions in the present invention are such that the yarn number count T of the sewing thread to be used is $10 < T \leq 60$, and preferably $20 \leq T \leq 60$, while the relation between the stitch number S (stitches/cm) and the yarn number count T of the sewing thread is $2 \leq T/S \leq 8$.

The base fabric used in conventional air bags is a woven fabric with a relatively firm weave structure having a basis weight of between 170 and 180 g/m² using a thick yarn of no less than 315 denier. When a variety of parts obtained by cutting such a base fabric are sewn together to form a bag body, they are sewn using a thick sewing thread with a yarn number count of or less, that is a thread of at least 750 denier. The sewing needles used during sewing are a thick needles suitable for such a thread.

However, a pliant woven fabric made with raw yarn of less than 150 denier such as that in the present invention runs the risk of becoming damaged when sewn by a method such as that used in the past. Specifically, single filaments constituting conventional raw yarn of not less than 315 denier each has a single filament denier of 3 or more and individual filaments are relatively thick, whereas single filaments usually constituting a raw yarn of less than 150 denier are each a fine single filament of 2 denier or less. When a woven fabric is sewn with a thick sewing thread with a large yarn number count and the corresponding thick needle for a sewing machine, the-single filament tends to be damaged by the tip of the needle, and unnecessarily large sewing seam holes are formed in the woven fabric by being pierced by the sewing thread with a large yarn number count.

Meanwhile, during bag deployment, a substantial load is instantaneously imposed on peripheral areas of the air bag inflator fitting hole which are reinforced for securing with a reinforcing fabric, particularly seams which are near the slits or bolt holes for the inflator or for attaching support metal fixtures for securing the inflator, and which are located further away from the fitting hole.

When a bag body is formed by a conventional sewing method from a light, pliant woven fabric featuring the use of fine raw yarn as in the case of the present invention, yarn that has been damaged by a sewing needle or large seam holes can cause the sides around the inflator fitting hole, and in some cases the outer periphery of the main body, to damage from the force of impact during deployment.

As noted above, the present invention relates to an air bag which is sewn by a specific sewing method, allowing an extremely thin, pliant woven fabric made of yarn of less than 150 denier, a cover factor of 2100 or more, and a basis weight of 140 g/m² or less to withstand impact during air bag deployment.

The sewing conditions in the present invention must comply with either Formula (1) or (2) below, which specify the appropriate range for the yarn number count T of a sewing thread and the relationship between the yarn number count T and the stitch number S (stitches/cm).

$$10 < T \leq 60 \tag{1A}$$

$$2 \leq T/S \leq 8 \tag{1B}(1)$$

or $$20 \leq T \leq 60 \tag{2A}$$

$$2 \leq T/S \leq 8 \tag{2B}(2)$$

Figure 6:
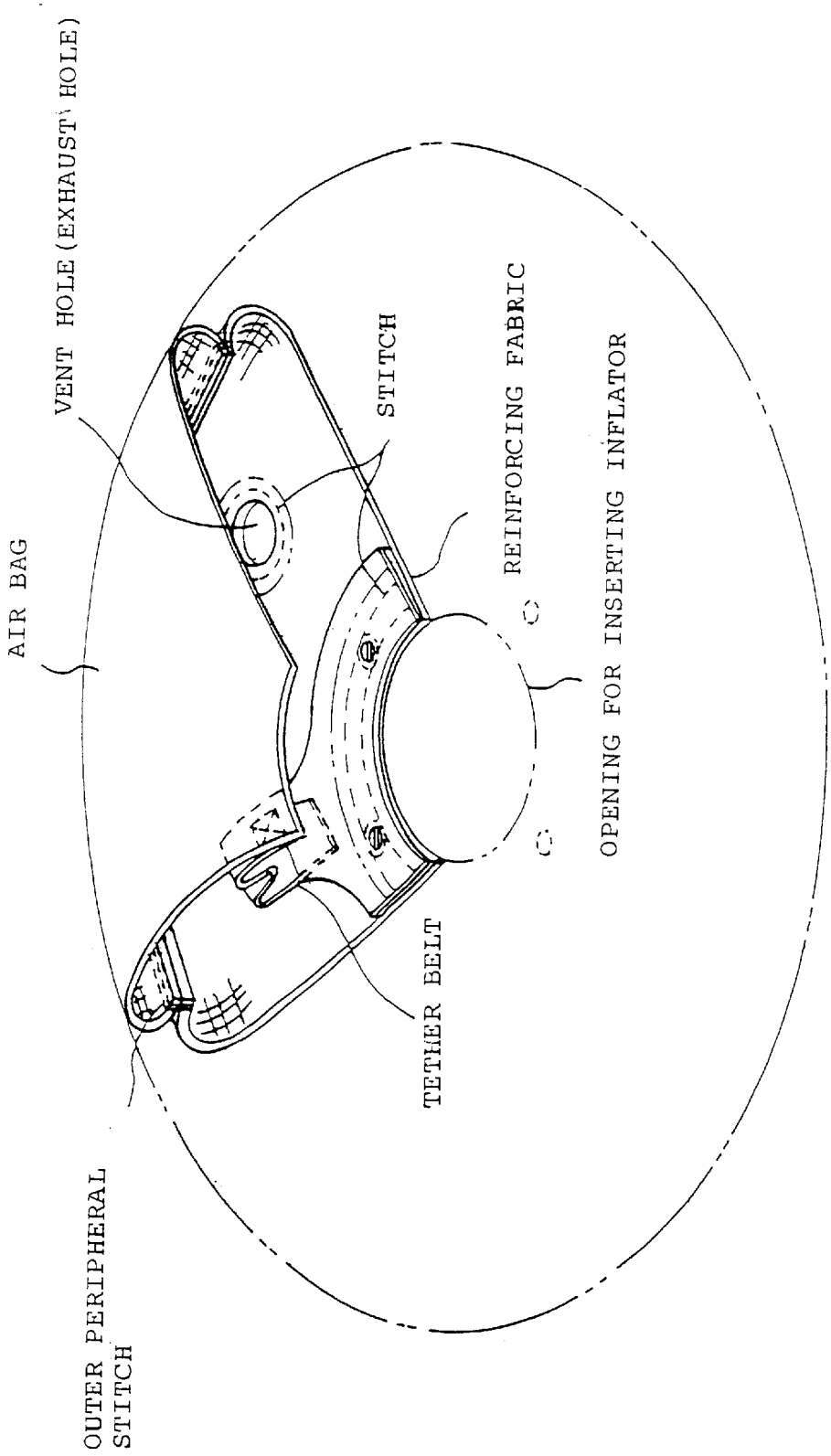
FIG. 6 is a schematic of the air bag.

FIG. 6 is a schematic of the air bag. The key features of the present invention are the stitch number and the yarn number count of the sewing threads used in the seams at the outer periphery of the main body base fabric, the reinforcing fabric for the fitting hole and the reinforcement fabric for the vent hole, the area for securing the tether belt, etc. shown in FIG. 6.

The yarn number count T of the sewing thread used in at least a portion of the seam parts (e.g., the outer periphery of the main body base fabric, the reinforcing fabric for the vent hole and the reinforcement fabric for the inflator fitting hole, the tether belt, and the like) of the air bag must be within the range $10 < T \leq 60$, preferably $20 \leq T \leq 60$, and even more preferably $20 \leq T \leq 50$ in the present invention. A yarn number count of less than 10, that is, a thick thread, will result in large sewing seam holes in the woven fabric, whereas a yarn number count of more than 60, that is, a fine thread, will be less effective in reinforcing parts that are sewn together. As used herein, the yarn number count of a sewing thread indicates a yarn number count of a sewing thread referred to as a chemical fiber sewing thread stipulated in JIS L-2510, L-2511, and L-2512. In the case of filament thread, the relationship between the count and denier is summarized as follows: 10 yarn number count is from 740 to 860 denier, 20 yarn number count is from 600 to 720 denier, 30 yarn number count is from 400 to 480 denier, 40 yarn number count is from 270 to 330 denier, 50 yarn number count is from 200 to 240 denier, and 60 yarn number count is from 140 to 170 denier. For spun yarn thread, the yarn number count should be converted from the decitex in the table of numerical values given in each of the JIS noted above.

In the present invention, the ideal seam strength can be obtained by using the stitch number S (stitches/cm) suited to the yarn number count T. That is, the stitch number S (stitches/cm) for the yarn number count T of a sewing thread must be stipulated so as to give $2 \leq T/S \leq 8$, and preferably $3 \leq T/S \leq 7$.

When T/S is lower than 2, a tight seam results, the parts that are sewn together are rough and stiff, and more times are needed for sewing. When T/S is greater than 8, the seams are overly coarse, and it becomes impossible to ensure suitable seam strength. The sewing needles used for sewing in the present invention are fine needles with a needle number of 20 or less, such as a number of 18 or 16, which is lower than that of the thicker needles with a needle number of more than 20 or more used for conventional air bags. The use of sewing needles with round tips, referred to as a ball-point type, is more effective. The type of seam used in the present invention should be selected according to the woven fabric that is being used, the type of bag, the required strength of the fitting hole, or the like. Examples include lock stitch, double chain stitch, felled stitch, overlooked stitch, safety stitch, zigzag chain stitch, and covering chain stitch, as well as combinations thereof.

In this invention, if the threads having different yarn number counts are used for the needle thread and bobbin thread, etc., both threads preferably comply with the relationship in the relational Formulas (1) and (2) in the present invention, but it is also permissible if only one of the needle thread and the bobbin thread comply with Formula (1) or (2). The threads used in the present invention should be suitably selected from those which are commonly referred to as chemical fiber threads or those used as industrial threads. Examples include nylon 6, nylon 66, polyesters, vinylon, aramids, fluorine, carbon, and glass, any of which may come in the form of spun yarn, twisted filament yarn, or resin finished filament yarn.

The present invention is also an air bag in which the outer periphery of the air bag is sewn under specific conditions. The type of seam may be selected from lock stitch, double chain stitch, felled stitch, overlooked stitch, safety stitch, zigzag chain stitch, and covering chain stitch. The sewing conditions should comply with the aforementioned Formulas (1) or (2) in the present invention.

When reinforcing fabric is secured to the inflator fitting hole of the present invention, the fabric is sewn under specific sewing conditions to increase the bursting strength of the air bag.

When vent holes located in the air bag of the present invention are provided with a reinforcing fabric, this fabric should also be sewn under specific sewing conditions. The tether belt which is provided to control the initial thrust of the air bag and to rapidly stabilize the deployed shape of the air bag should also be sewn under specific sewing conditions, even when sewn to the bag main body. The aforementioned relational formulas in the present invention should also be satisfied in sewing other parts of the air bag in the present invention, such as hot gas deflector fabric and flame-proof fabric.

In a preferred example of the invention, the woven fabric forming the bag body and the reinforcing woven fabric (reinforcing fabric) secured around the periphery of the inflator fitting hole are sewn together on top of each other, with the yarn axes of the respective woven fabrics oriented in the same direction, and an opening for securing the inflator is provided on the yarn axis of the reinforcing woven fabric passing through the center of the inflator fitting hole or on an axis parallel to the aforementioned yarn axis.

The bag body woven fabric and the woven fabric used as the fitting hole reinforcing fabric are sewn together, with the yarn axes of the respective woven fabrics oriented in the same direction, and an opening for securing the inflator is provided on the yarn axis of the reinforcing woven fabric passing through the center of the inflator fitting hole or on an axis parallel to the aforementioned yarn axis, in order to make it possible to increase the strength of the fitting hole where substantial impact force is applied during bag deployment. As used herein, the opening for securing the inflator includes bolt holes for securing the inflator, or boit holes and/or slits for metal fixtures used for securing the inflator.

The shape of the inflator fitting hole of the air bag in the present invention should be selected from commonly used shapes such as circle, oblong, elliptical, square, rectangular, or rhomboidal shapes. The shape is not particularly restricted.

The reinforcing fabric used to reinforce the periphery around the inflator fitting hole of the air bag in the present invention may be the same woven fabric as that used for the bag body, but separately prepared reinforcing woven fabrics, such as one or more woven fabrics thicker than the air bag woven fabric in the present invention produced using nylon 66 with a denier of 840, 420, 315, or the like can also be used. The reinforcing fabric used herein includes flame-proof fabrics for blocking the hot gas discharged from the inflator. The reinforcing fabric may be coated with a silicone resin, fluororesin or other heat resistant resin, heat resistant rubber, or the like to provide heat resistance, and fabrics made of heat resistant fibers such as aramid fibers can also be used.

Suitable locations for the air bag according to the present invention include any commonly used air bag location, such as the driver seat, passenger seat, body sides (including inflatable curtain), and rear seat. The cut shape of body parts of the air bag can be round, oblong, elliptical, rectangular, polygonal, or any combination thereof, as long as the necessary deployed shape is afforded.

Devices for manufacturing the woven fabric should be suitably selected from various looms used to produce common industrial woven fabrics, such as shuttle looms, water jet looms (WJL), air jet looms (AJL), rapier looms, and projectile looms. The woven fabric may be a plain weave, mat weave, twill weave, check weave (rip stop weave), or combinations thereof. In some cases, dobbies, jacquards, and the like may be used with looms to produce various modifications.

The woven fabric forming the air bag of the present invention can be made air-impermeable by applying a heat resistant elastomer, depending on the inflator performance, air bag volume, location to be applied, and the like. Uncoated woven fabrics that have not been subjected to such a treatment for imparting air-impermeability may also be used. Uncoated woven fabrics should be scoured, dried, heat set, and the like. Conditions such as the heat setting temperature should be selected upon a consideration of the air permeability, mechanical properties, and the like.

The filaments used to form the woven fabric are not particularly restricted. Examples include polyamide fibers obtained from nylon 6, nylon 66, nylon 46, nylon 610, nylon 612, and the like, either alone or copolymers or mixtures thereof; polyester fibers obtained from polyethylene terephthalate, polytrimethylene terephthalate, polybutylene terephthalate, polyethylene naphthalate, and the like, either alone or copolymers or mixtures thereof; aramid fibers such as para-pheneylene terephthalamide or copolymers thereof with aromatic ethers; wholly aromatic polyester fibers, vinylon fibers, ultra-high molecular weight polyethylene and other polyolefin fibers, vinyl chloride and vinylidene chloride fibers, polytetrafluoroethylene-containing fluorine fibers, polysulfone (PS) fibers, polyphenylene sulfide fibers (PPS), polyether ether ketone (PEEK) fibers, polyimide fibers, polyether imide fibers, high-strength rayon-containing cellulose fibers, acrylic fibers, carbon fibers, glass fibers, silicon carbide (SiC) fibers, and alumina fibers. In some cases, the fibers may include inorganic fibers such as metal fibers, typically steel.

Various commonly used additives, such as heat resistant stabilizers, antioxidants, photo-resistant stabilizers, anti-aging agents, lubricants, smoothing agents, pigments, water repellents, oil repellents, opacifiers such as titanium oxide, gloss-providing agents, flame retardants, and plasticizers, may be used alone or in combination to improve the spinning properties, processability, and durability of such fiber filaments. In some cases, processes such as twisting, bulking, crimping, and winding may also be undertaken.

The filaments may be long fiber filaments, spun short fiber filaments, or composite filaments thereof, and are not particularly restricted.

In a preferred example of the present invention, woven fabric onto which heat resistant elastomer is applied in an amount of 10 g/m$^2$ or less may be used.

The method for applying the heat resistant elastomer may be a processing method such as 1) a coating method (knife, kiss, reverse, etc.), 2) a dipping method, or 3) a printing method (screen, roll, rotary, etc.). The heat resistant elastomer may be used in the form of a solvent system, emulsion system, aqueous solution system, fine powder system, or the like.

The heat resistant elastomer used in the present invention should be a material suitable for the aforementioned processes. Examples include silicone systems, fluorine systems, chlorine systems, polyurethane systems, epoxy systems, polyester systems, polyamide systems, polyimide systems, chlorosulfone systems, phenolic systems, and acrylic systems, either alone or in combinations of two or more, or in the form of copolymerized products. Silicone systems, fluorine systems, and polyurethane systems are particularly preferred for improving the mechanical properties of the woven fabric, for heat resistance, and the like.

The heat resistant elastomer may be applied on part or all of at least one surface of the woven fabric, or in part or all of the gaps of the woven fabric or gaps between the fiber filaments, and the like.

Various pre-treatment agents, adhesion improvers, and the like may be added to the heat resistant elastomer in order to improve adhesion with the base fabric, and the surface of the woven fabric may be pre-treated with a primer treatment or the like. Processing agents may also be added to the elastomer to provide heat resistance, aging resistance, antioxidant properties, and the like. In order to improve the physical properties of the elastomer, after the elastomer has been applied to the woven fabric, it may be treated such as by a hot air treatment, contact heat treatment, high energy treatment (high frequency, electron rays, UV rays) or the like to bring about drying, cross-linking, vulcanization, or the like.

A heat resistant elastomer should be provided depending on the inflator performance, air bag volume, location to be applied, and the like. Woven fabric provided with such an elastomer may also be used for part of an air bag consisting of an uncoated woven fabric.

EXAMPLES

The present invention is described in further detail below with reference to examples. The performance of air bags and woven fabric in the examples was evaluated by the following methods.

(1) Tear Strength

The tear strength of the woven fabric was evaluated in accordance with JIS L-1096 (method of 6.15.1 A-1: Single-tongue Method). Measurements were taken in the warp and weft directions, and the mean value when N=3 was used.

(2) Seam Strength

The seam strength of woven fabrics was evaluated in accordance with JIS L-1093 (method of 6.1: Grab Method). Tables 1 and 3 show the results of evaluation for the seam strength of the reinforcing fabric sewn at the inflator fitting hole, and Table 2 shows those of the outer peripheries sewn as in the specified way. Measurements were taken only in the warp direction, and the mean value when N=5 was used.

(3) Deployment Tests

Two types of inflator for driver seat airbag A or B (non-azide type; maximum tank pressure at 60 liters was given 185 kPa by A and 200 kPa by B), metal fixtures, and a resin cover were used. The bags were folded and accommodated in the modules, preheated to 85° C. for 4 hours, and then experimentally deployed. The maximum internal pressure of the each bag was determined, and the bag was visually inspected for damage following deployment.

Example 1

A plain weave fabric with a woven density of 114/inch for warp and 96/inch for weft was produced using nylon 66 fibers of 120 d/102 f (raw yarn strength 6.5 g/d). The woven fabric was scoured and heat set, resulting in an uncoated woven fabric with a warp density of 115/inch and a weft density of 96/inch. The basis weight of the woven fabric was 126 g/m$^2$.

Figure 2:
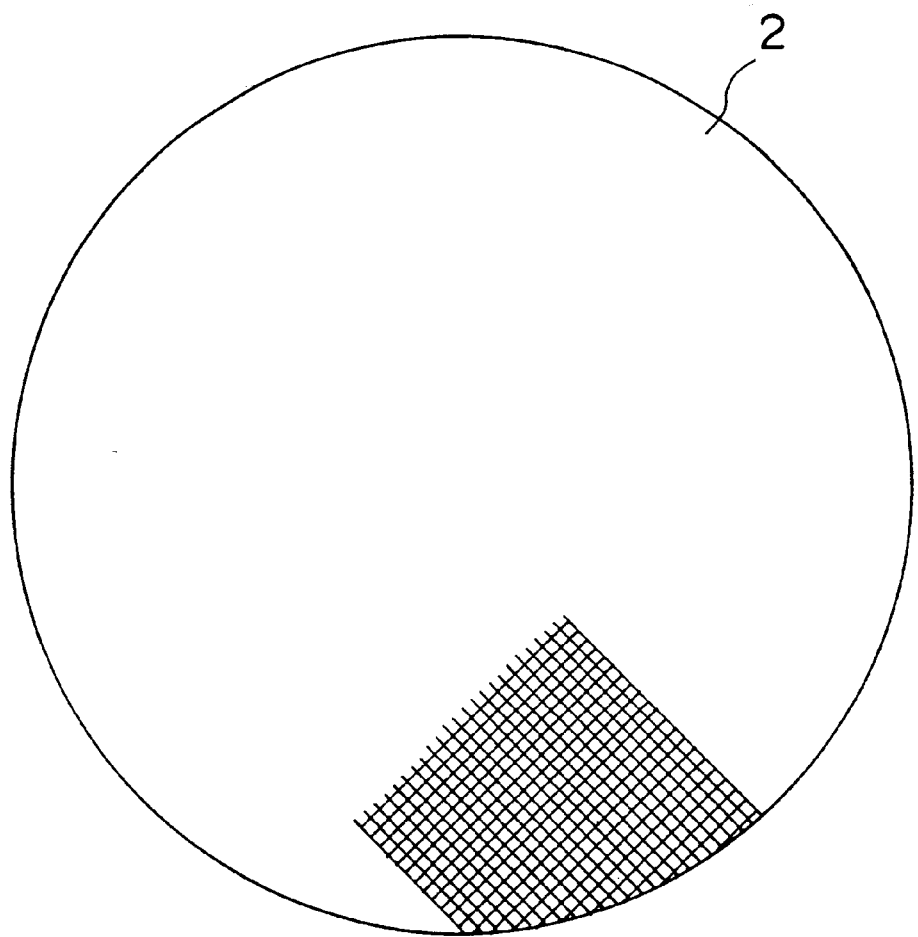
FIG. 2 is an illustration of another circular fabric concentrically sewn together with the above circular fabric.
Figure 3:
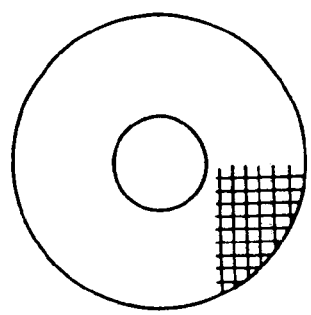
FIG. 3 is an illustration of reinforcing fabric around the periphery of the inflator fitting hole of the bag body.
Figure 3:
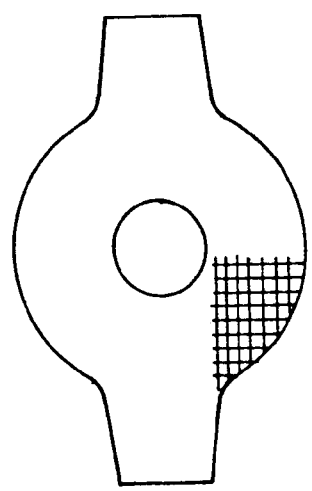

Two pieces of circular fabric (1, 2) with a diameter ø of 720 mm, as shown in FIGS. 1 and 2, were then cut out from the uncoated woven fabric, an opening of ø 70 mm was provided as an inflator fitting hole in the center of one circular fabric 1, and two circular holes of ø 35 mm were provided as vent holes. Plain weave fabrics A and B were produced using nylon 66 fibers of 420 d/70 f as a reinforcing fabric for the inflator fitting hole, and the fabrics were scoured and heat set. The resulting plain weave fabric A was used as an uncoated woven fabric with a warp and weft density of 53/inch each, while the plain weave fabric B was used, with a warp and weft density of 46/inch each, in the form of a coated woven fabric having silicone rubber applied thereon in an amount of 40 g/m$^2$. One donut-shaped fabric sheet with a diameter of ø 220 mm and a bore of ø 70 mm, as shown in FIG. 3, was cut out from each of plain weave fabrics A and B, as a reinforcing fabric piece for the inflator fitting hole.

Figure 4:
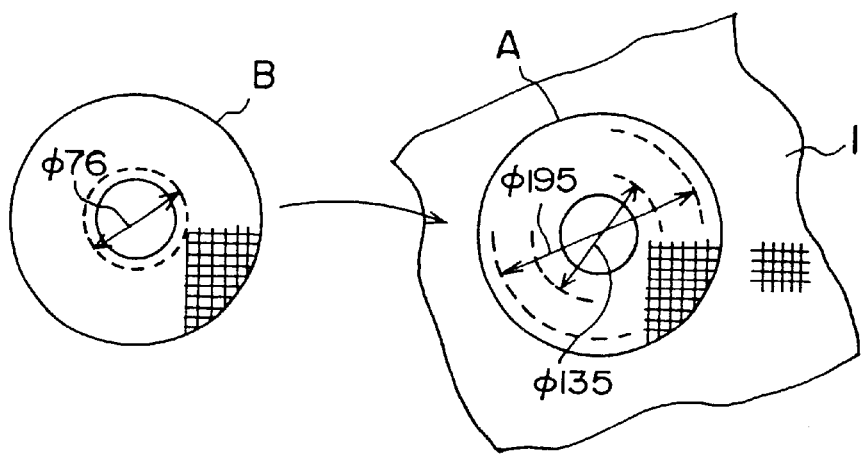
FIG. 4 is an illustration of reinforcing fabrics A and B sewn around the periphery of the inflator fitting hole of the circular fabric.

The uncoated reinforcing fabric piece A cut out from plain weave fabric A was superposed on the center of the circular fabric 1, with the yarn axes of the circular fabric and the reinforcing fabric oriented in the same direction, as shown on the right side of FIG. 4, and these fabrics were sewn together at locations corresponding to a seam diameter of ø 195 mm (outer line) and ø 135 mm (middle line). The fabrics were sewn together by lock stitches with a stitch number of 6 stitches/cm, using a sewing needle of No. 16 and a nylon 66 sewing thread of 30-yarn number count for both the needle and bobbin threads. The coated reinforcing fabric B having the same shape and structure as that shown in FIG. 3 above (left side of FIG. 4), which had been cut out from the plain weave fabric B, was superposed on the above mentioned fabric, with the yarn axial directions oriented in the same manner as the reinforcing fabric A, and the sheets were sewn together at a seam diameter of ø 76 mm (inner line). The sewing thread was nylon 66 thread of 5-yarn number count for both the needle and bobbin threads. The fabrics were sewn together by lock stitches with a stitch number of 4.5 stitches/cm, using a sewing needle of No. 23. As vent hole reinforcing fabric pieces, two donut-shaped fabric pieces with a diameter of ø 65 mm and a bore of ø 35 mm were cut out from plain weave fabric A, and the respective fabric pieces were superposed on the two different vent holes of circular fabric 1, respectively, and was sewn at a seam diameter of ø 50 mm. The sewing thread was a nylon 66 thread of yarn number count of 30 for both the needle and bobbin threads. The fabrics were sewn together by lock stitches with a stitch number of 4 stitches/cm, using a sewing needle of No. 16.

Figure 5:
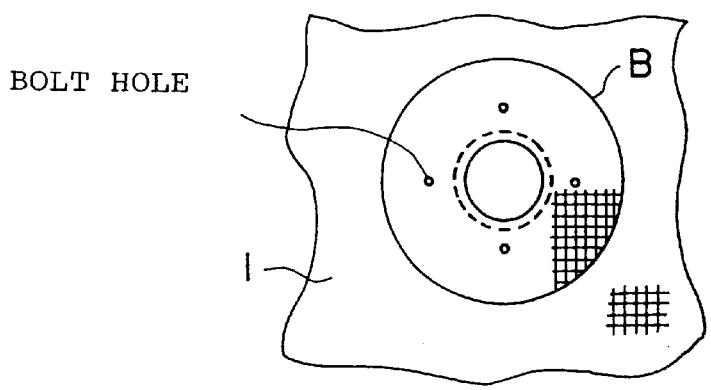
FIG. 5 is an illustration of the positional relationship between the bolt hole for attachment to the inflator and the yarn axis of the reinforcing fabric.

Inflator fitting bolt holes with a bore of ø 5.5 mm were opened in the center of the circular fabric 1 to which the reinforcing fabric pieces had been sewn. The holes were located in the axial directions of the yarn of the circular fabric 1 and reinforcing fabrics, as shown in FIG. 5.

Circular fabrics 1 (FIG. 1) and 2 (FIG. 2) were superposed on each other, with the respective yarn axes offset 45°, and were sewn together at 20 mm inside along the outer peripheral edge. The sewing thread was a nylon 66 thread of yarn number count 8 for the needle thread, and a nylon 66 thread of yarn number count 30 for the bobbin thread. The fabrics were sewn together by double chain stitches (two rows) with a stitch number of 5 stitches/cm, using a sewing needle of No. 18.

Each of the thus obtained air bags was turned inside out through the fitting hole and submitted to a deployment test. Samples were prepared under the same sewing conditions as the middle and outer lines of the inflator fitting hole using the woven fabric used as the circular fabrics, and the seam strength was determined in accordance with JIS L-1093. The results are given in Table 1.

The deployed bags showed no damages or the like at either the inflator fitting holes or the outer periphery. High level seam strength was achieved.

Comparative Example 1

Air bags and samples for determining seam strength were prepared in the same manner as in Example 1 except that the middle and outer lines of the inflator fitting hole in Example 1 were sewn under two different sets of conditions:

(1) by lock stitches with a stitch number of 3.5 stitches/cm, using a nylon 66 thread of 8-yarn number count and a sewing needle of No. 22; and (2) by lock stitches with a stitch number of 9 stitches/cm, using a nylon 66 thread of 80-yarn number count and a sewing needle of No. 12.

Tests were conducted in the same manner as in Example 1. The results are given in Table 1.

Although condition (1) resulted in a high seam strength, the woven fabrics burst. In the bag deployment test, the bag body burst at the outer seam line of the fitting hole.

Condition (2) resulted in low seam strength and sewing thread breakage. In the bag deployment test, the threads of the middle and outer seam lines of the fitting hole were broken, and the reinforcing fabric and bag body separated, causing the bag body to burst near the seams.

Example 2

A plain weave fabric with a warp and weft woven density of 99/inch each was produced using nylon 66 fibers of 140 d/84 f (raw yarn strength 8.0 g/d). The woven fabric was scoured and heat set, resulting in an uncoated woven fabric with a warp and weft density of 99.5/inch each. The basis weight of the woven fabric was 138 g/m$^2$.

Air bags and samples for determining seam strength were prepared in the same manner as in Example 1, except that the above woven fabric was used as the air bag body and the seam portions at the middle and outer lines of the inflator fitting hole were sewn by lock stitches with a stitch number of 4.5 stitches/cm, using a sewing nylon 66 thread of 20-yarn number count for the needle and bobbin threads and a sewing needle of No. 18.

A rectangular (600 mm long by 80 mm wide from the bias direction of plain weave fabric B) piece with 120 mm bulges in the sewing portions at both ends and in the middle was cut out as a tether belt (see tether belt in FIG. 6), the center of the tether belt was superposed in the center of circular fabric 2 and was sewn in two circular rows (ø 100 mm, ø 90 mm) using lock stitches with a stitch number of 6 stitches/cm with a nylon 66 thread of 30-yarn number count. Both ends of the tether belt were inserted between two flaps above and below the reinforcing fabric having the shape depicted in FIG. 3(2) (produced from weave fabric A), and were sewn by lock stitches with a stitch number of 3.5 stitches/cm, using a nylon 66 thread of 8-yarn number count. Tests were conducted in the same manner as in Example 1, the results of which are given in Table 1.

The deployed bags showed no damage or the like in either the inflator fitting holes or the outer periphery. High level seam strength was achieved.

Comparative Example 2

Air bags and samples for determining seam strength were prepared in the same manner as in Example 2 except that the seam portions at the middle line and at the outer line of the inflator fitting hole in Example 2 were sewn respectively by lock stitches with a stitch number of 3.5 stitches/cm, using a sewing thread of a nylon 66 thread of 30-yarn number count for the needle thread and the bobbin thread and a sewing needle of No. 16. Tests were conducted in the same manner as in Example 2, the results of which are given in Table 1.

TABLE 1

|  | Properties of woven fabric | | Sewing specifications of fitting hole | | | Deployment test | | |
| --- | --- | --- | --- | --- | --- | --- | --- | --- |
|  | Cover factor (CF) | Basis weight (g/m$^2$) | Yarn number count of sewing thread (T) | Stitch number (s) (stitches/cm) | T/S | Seam strength (N) | Max. bag internal pressure (kpa) | State of bag |
| Example 1 | 2311 | 126 | 30 | 6 | 5 | 872 | 11 | No damages |
| Comparative Example 1(1) |  |  | 8 | 3.5 | 2.3 | 774 | 4 | Part of bag body was broken at seam around fitting hole. |
| Comparative Example 1(2) |  |  | 80 | 9 | 8.9 | 587 | 5 | Thread around fitting hole was broken, and bag body was partially broken. |
| Example 2 | 2355 | 138 | 20 | 4.5 | 4.4 | 990 | 12 | No damages |

TABLE 1-continued

| | Properties of woven fabric | | Sewing specifications of fitting hole | | | Deployment test | | |
|---|---|---|---|---|---|---|---|---|
| | Cover factor (CF) | Basis weight (g/m²) | Yarn number count of sewing thread (T) | Stitch number (s) (stitches/cm) | T/S | Seam strength (N) | Max. bag internal pressure (kpa) | State of bag |
| Comparative Example 2 | | | 30 | 3.5 | 8.6 | 863 | 6 | Thread around fitting hole was broken, bag body was partially broken. |

Remarks: Inflator A was used for deployment tests

Example 3

A plain weave fabric with a warp and weft woven density of 90/inch each was produced using nylon 66 fibers of 140 d/68 f (raw yarn strength 8.2 g/d). The woven fabric was scoured and heat set, resulting in uncoated woven fabric with a warp and weft density of 93/inch and 91/inch, respectively. The basis weight of the woven fabric was 122 g/m².

Two pieces of circular fabric (1, 2) with a diameter of ø 720 mm, as shown in FIGS. 1 and 2, were then cut out from the uncoated fabric, an opening of ø 70 mm bore was provided as an inflator fitting hole in the center of one circular fabric 1, and two circular holes of ø 35 mm were provided as vent holes. Plain weave fabrics A and B were produced using nylon 66 fibers of 420 d/70 f as a reinforcing fabric for the inflator fitting hole, and the fabrics were scoured and heat set. The resulting plain weave fabric A was used in the form of an uncoated woven fabric with a warp and weft density of 53/inch each, while plain weave fabric B was used, with a warp and weft density of 46/inch each, in the form of a coated woven fabric having silicone rubber applied thereon in an amount of 40 g/m². One donut-shaped fabric sheet with a diameter of ø 220 mm and a bore of ø 70 mm, as shown in FIG. 3, was cut out from plain weave fabrics A and B, as reinforcing fabric pieces for the inflator fitting hole.

The uncoated reinforcing fabric piece A cut out from plain weave fabric A was superposed on the center of the circular fabric 1, with the yarn axes of the circular fabric and the reinforcing fabric oriented in the same direction as shown in FIG. 4, and the fabrics were sewn together at locations corresponding to a seam diameter of ø 195 mm (outer line) and ø 135 mm (middle line). The sheets were sewn by lock stitches with a stitch number of 5 stitches/cm, using a sewing thread of a nylon 66 thread of 20-yarn number count for both the needle thread and the bobbin threads and a sewing needle of No. 18. The coated reinforcing fabric B having the same shape and structure as that shown in FIG. 3 above, which had been cut out from the plain weave fabric B, was superposed on the above fabric, with the yarn axial directions oriented in the same manner as the reinforcing fabric A, and the sheets were sewn together at a seam diameter of ø 76 mm (inner line). The sewing thread was a nylon 66 thread of 5-yarn number count for both the needle and bobbin threads. The fabrics were sewn together by lock stitches with a stitch number of 4.5 stitches/cm, using a sewing needle of No. 23.

As vent hole reinforcing fabric pieces, two donut-shaped fabric sheets with a diameter of ø 65 mm and a bore of ø 35 mm were cut out from plain weave fabric A, each was superposed on the vent holes of circular fabric 1, and were sewn at a seam diameter of ø 50 mm. The sewing thread was a nylon 66 thread of 30-yarn number count for both the needle and bobbin threads. The fabrics were sewn together by lock stitches with a stitch number of 4 stitches/cm, using a sewing needle of No. 16.

Inflator fitting bolt holes with a bore of ø 5.5 mm were opened in the center of the circular fabric 1 to which the reinforcing fabric pieces had been sewn. The holes were located in the axial directions of the yarn of the circular fabric 1 and reinforcing fabrics, as shown in FIG. 5.

Circular fabrics 1 (FIG. 1) and 2 (FIG. 2) were superposed on each other, with the respective yarn axes offset 450, and were sewn together at 20 mm inside along the outer peripheral edge as shown in FIG. 6. The sewing thread was a nylon 66 thread of 20-yarn number count for the needle and bobbin threads. The fabrics were sewn together by double chain stitches (two rows) with a stitch number of 5 stitches/cm, using a sewing needle of No. 18.

The air bag was then turned inside out through the fitting hole and submitted to a deployment test.

The deployed bags showed no dameges or the like in either the inflator fitting holes or the outer periphery. High level seam strength was achieved.

Comparative Example 3

Air bags and samples for determining seam strength were prepared in the same manner as in Example 3 except that the outer periphery of the circular fabrics 1 and 2 in Example 3 were sewn together under two different sets of conditions:

(1) by multi-thread chain stitches (two rows) with a stitch number of 3.5 stitches/cm, using a nylon 66 thread of 8-yarn number count and a sewing needle of No. 22; and (2) by multi-thread chain stitches (two rows) with a stitch number of 9 stitches/cm, using a nylon 66 thread of 80-yarn number count and a sewing needle of No. 12.

Tests were conducted in the same manner as in Example 3. The results are given in Table 2.

Under condition (1), the bag main body was broken at the outer peripheral seam in the deployment test.

Under condition (2), the thread of the outer peripheral seam was broken in the deployment test.

Comparative Example 4

Air bags were produced in the same manner as in Example 3, except that an uncoated woven fabric with a basis weight of 116 g/m² and a warp and weft weaving density of 88/inch each was used as the air bag body woven fabric instead of that used in Example 3. Tests were conducted in the same manner as in Example 3. The results are given in Table 2.

Since a cover factor of 2100 or less resulted in a woven fabric with unsatisfactory mechanical strength, the seam strength was lower, and the base fabric ruptured at the outer peripheral seam of the inflator fitting hole in the deployment test.

were sewn by lock stitches with a stitch number of 5 stitches/cm, using a nylon 66 sewing thread of 20-yarn number count for both the needle and bobbin threads and a sewing needle of No. 18. The coated reinforcing fabric B having the same shape and structure as that shown in FIG. 3 above, which had been cut out from the plain weave fabric B, was superposed on the above fabric, with the yarn directions oriented in the same manner as the reinforcing fabric A, and the fabrics were sewn together at a seam

TABLE 2

| | Properties of woven fabric | | Sewing specifications of fitting hole | | | | Deployment test | |
|---|---|---|---|---|---|---|---|---|
| | Cover factor (CF) | Basis weight (g/m$^2$) | Yarn number count of sewing thread (T) | Stitch number (s) (stitches/cm) | T/S | Seam strength (N) | Max. bag internal pressure (kpa) | State of bag |
| Example 3 | 2177 | 122 | 20 | 5 | 4 | 1026 | 9 | No damages |
| Comparative Example 3(1) | | | 8 | 3.5 | 2.3 | 710 | — | Bag body was broken at peripheral seam |
| Comparative Example 3(2) | | | 80 | 9 | 8.9 | 592 | — | Peripheral seam thread was broken, bag body opened. |
| Comparative Example 4 | 2082 | 116 | 20 | 5 | 4 | 551 | — | Bag body was partially broken at seams around fitting hole, deflated. |

Remarks: Inflator A was used for deployment tests

Example 4

A plain weave fabric with a woven density of 92/inch for warp and 96/inch for weft was produced using nylon 66 fibers of 140 d/68 f (raw yarn strength 8.2 g/d). The woven fabric was scoured and heat set, resulting in an uncoated woven fabric with a warp density of 96/inch and a weft density of 98/inch. The woven fabric had a cover factor of 2295 and a basis weight of 134 g/m$^2$. One side of the uncoated woven fabric was then coated with a silicone rubber solvent solution (by roll-coating), and the solution was dried and heat treated, giving a coated woven fabric. The silicone rubber was applied in an amount of 6 g/m$^2$ (in terms of solids).

Two pieces of circular fabric (1, 2) with an diameter ø of 720 mm, as shown in FIGS. 1 and 2, were then cut out from the coated fabric, an opening of ø 70 mm was provided as an inflator fitting hole in the center of one circular fabric 1, and two circular holes of ø 30 mm were provided as vent holes. Plain woven fabrics A and B were produced using nylon 66 fibers of 420 d/70 f as reinforcing fabrics for the inflator fitting hole, and the fabrics were scoured and heat set. The resulting plain weave fabric A was used in the form of uncoated woven fabric with a warp and weft density of 53/inch each, while the plain weave B was used, with a warp and weft density of 46/inch each, in the form of a coated woven fabric having silicone rubber applied thereon in an amount of 40 g/m$^2$. One donut-shaped fabric sheet with a diameter of ø 220 mm and a bore of ø 70 mm, as shown in FIG. 3, was cut out from each of plain weave fabrics A and B, as reinforcing fabric pieces for the inflator fitting hole.

The uncoated reinforcing fabric piece A cut out from plain weave fabric A was superposed on the center of the circular fabric 1, with the yarn axes of the circular fabric and the reinforcing fabric oriented in the same direction as shown in FIG. 4, and the fabrics were sewn together at locations corresponding to seam diameters of ø 198 mm and ø 192 mm (outer lines) and ø 135 mm (middle line). The fabrics diameter of ø 76 mm (inner line). The sewing conditions were based on those for the middle and outer lines.

As vent hole reinforcing fabric pieces, two donut-shaped fabric sheets with a diameter of ø 60 mm and a bore of ø 30 mm were cut out from plain weave A, the sheet was superposed on each of the vent holes of the circular fabric 1, and the location corresponding to a seam diameter of ø 45 mm was sewn. The sewing thread was a nylon 66 thread of 30-yarn number count for both the needle and bobbin threads. The fabrics were sewn together by lock stitches with a stitch number of 5 stitches/cm, using a sewing needle of No. 16.

Inflator fitting bolt holes with a bore of ø 5.5 mm were opened in the center of the circular fabric 1 to which the reinforcing fabric pieces had been sewn. The holes were located in the axial direction of the yarns of the circular fabric 1 and the reinforcing fabrics, as shown in FIG. 5.

The circular fabrics 1 (FIG. 1) and 2 (FIG. 2) were superposed on each other, with the respective yarn axes offset 45°, and were sewn together at 20 mm inside along the outer peripheral edge as shown in FIG. 6. The sewing thread was a nylon 66 thread with a yarn number count of 20 for the needle and bobbin threads. The fabrics were sewn together by double chain stitches (two rows) with a stitch number of 5 stitches/cm and a sewing needle of No. 18.

The air bag was turned inside out through the fitting hole and submitted to a deployment test.

The deployed bags showed no damages or the like at either the inflator fitting holes or the outer periphery. High levels of tear strength and seam strength was achieved.

Example 5

Air bags were prepared in the same manner as in Example 4, except that an uncoated woven fabric with no heat resistant elastomer was used for the air bag base fabric instead of that used in Example 4. The performance was evaluated. The results are given in Table 3.

The seam strength was high enough, and the maximum internal pressure of the bag was somewhat low, but the bag did not show any damages.

Example 6

Air bags and samples for determining seam strength were prepared in the same manner as in Example 4, except that an uncoated plain weave fabric (with a cover factor of 2413, and a basis weight of 112 g/m²) composed of nylon 66 fibers of 80 d/68 f for warp and 120 d/102 f for weft (raw yarn strength of 8.4 g/d for both), with a woven density of 162/inch for warp and of 88/inch for weft, was coated with 4 g/m² of silicone rubber for use as the air bag woven fabric instead of that used in Example 4, the three outermost seams for sewing the reinforcing fabric of the inflator fitting holes were arranged in 3 rows (seam diameters ø of 198, 192, and 186), and the stitch number was 6.5 stitches/cm. Tests were conducted in the same manner as in Example 4. The results are given in Table 3. High seam strength was achieved, and deployment tests revealed no problems.

Comparative Example 5

One side of the uncoated woven fabric in Comparative Example 4 was coated with silicone rubber by knife coating in the same manner as in Example 4 until the woven fabric showed designated airtightness. The amount coated was 30 g/m². Air bags were prepared in the same manner as in Comparative Example 4, and the performance was evaluated. The results are given in Table 3.

INDUSTRIAL APPLICABILITY

As described above, the present invention provides a lightweight yet highly safe and reliable air bag sufficient to withstand impact during deployment through the selection of specific sewing conditions for the seam parts of the air bag, especially sewing conditions under which a reinforcing fabric is sewn around the inflator fitting hole.

The woven fabric used for the air bag body can also be provided with a small amount of a heat resistant elastomer to provide an air bag with extremely high airtightness, heat resistance, and mechanical properties.

What is claimed is:

1. A lightweight air bag composed of a plurality of members sewn together, the main body of the air bag constituted of a woven fabric which has been made using a raw yarn of less than 150 denier and has a cover factor of 2100 or more, at least part of the sewn areas relating to the air bag main body being sewn under conditions where the yarn number count T of a sewing thread and the stitch number S (stitches/centimeter) comply with the following Formulas (1) {Formulas (1A) and (1B)}:

$$10 < T \leq 60 \tag{1A}$$

$$2 \leq T/S \leq 8 \tag{1B}(1).$$

2. A lightweight air bag composed of a plurality of members sewn together, the main body of the air bag constituted of a woven fabric which has been made using a raw yarn having less than 150 denier and has a basis weight of 140 g/m² or less, at least part of the sewn areas relating to the air bag main body being sewn under conditions where the yarn number count T of a sewing thread and the stitch number S (stitches/centimeter) comply with the following Formulas (2) {Formulas (2A) and (2B)}:

$$20 \leq T \leq 60 \tag{2A}$$

$$2 \leq T/S \leq 8 \tag{2B}(2).$$

3. The lightweight air bag according to claim 2, in which the air bag main body is composed of a woven fabric having a cover factor of 2100 or more.

4. The lightweight air bag according to claims 1, in which the air bag is formed by sewing the peripheral edges of opposing base fabrics together so as to form a bag body, the sewing conditions for the peripheral edges of the air bag being such that the edges are sewn together in such a way as to comply with said Formula (1).

5. The lightweight air bag according to claims 1, comprising an inflator fitting hole, and a reinforcing fabric being sewn around the periphery thereof in such a way as to comply with said Formula (1).

6. The lightweight air bag according to claims 1, comprising a vent hole, and a reinforcing fabric being sewn

TABLE 3

| | Properties of woven fabric | | | | Sewing specifications at fitting hole | | | | Deployment test | |
|---|---|---|---|---|---|---|---|---|---|---|
| | Cover factor (CF) | Basis weight (g/m²) | Applied amount of heat resistant elastomer (g/m²) | Tear strength (N) (warp × weft) | Yarn number count of sewing thread (T) | Stitch Number (s) (stitches/cm) | T/S | Seam strength (N) | Max. bag internal pressure (kpa) | State of bag |
| Example 4 | 2295 | 135 | 6 | 152 × 145 | 20 | 5 | 4 | 1184 | 23 | No damages |
| Example 5 | | | 0 | 74 × 69 | 20 | 5 | 4 | 1097 | 16 | No damages |
| Example 6 | 2413 | 112 | 4 | 81 × 124 | 20 | 6.5 | 3.1 | 1123 | 22 | No damages |
| Comparative Example 5 | 2082 | 116 | 30 | 169 × 158 | 20 | 5 | 4 | 702 | 9 | Considerable displacement of seams around fitting hole and periphery area, partial breakage of bag body. |

Remarks: Inflator B was used for deployment tests around the periphery thereof in such a way as to comply with said Formula (1).

7. The lightweight air bag according to claims 1, comprising a tether belt, said tether belt being sewn to the air bag base fabric in such a way as to comply with said Formula (1).

8. The lightweight air bag according to claims 1, comprising a tether belt, said tether belt being sewn to the bag body with the aid of an auxiliary fabric, said auxiliary fabric being sewn to the air bag base fabric in such a way as to comply with said Formula (1).

9. The lightweight air bag according to claim 5, wherein the reinforcing fabric is sewn around the periphery of the inflator fitting hole of the bag body such that the woven fabrics forming the bag body and the reinforcing fabric secured around the periphery of the inflator fitting hole are superposed on each other and sewn together, with the yarn axes of the respective fabrics oriented in the same direction, and an opening for securing an inflator is provided on the yarn axis of the reinforcing fabric passing through the center of the inflator fitting hole or on a line parallel to said yarn axis.

10. The lightweight air bag according to claims 1, wherein a heat resistant elastomer is provided in an amount of no more than 10 g/m$^2$ on the woven fabric forming the main body of the air bag.

11. The lightweight air bag according to claim 3, in which the air bag is formed by sewing the peripheral edges of opposing base fabrics together so as to form a bag body, the sewing conditions for the peripheral edges of the air bag being such that the edges are sewn together in such a way as to comply with said Formula (1).

12. The lightweight air bag according to claim 3, comprising an inflator fitting hole, and a reinforcing fabric being sewn around the periphery thereof in such a way as to comply with said Formula (1).

13. The lightweight air bag according to claim 3, comprising a vent hole, and a reinforcing fabric being sewn around the periphery thereof in such a way as to comply with said Formula (1).

14. The lightweight air bag according to claim 3, comprising a tether belt, said tether belt being sewn to the air bag base fabric in such a way as to comply with said Formula (1).

15. The lightweight air bag according to claim 3, comprising a tether belt, said tether belt being sewn to the bag body with the aid of an auxiliary fabric, said auxiliary fabric being sewn to the air bag base fabric in such a way as to comply with said Formula (1).

16. The lightweight air bag according to claim 12, wherein the reinforcing fabric is sewn around the periphery of the inflator fitting hole of the bag body such that the woven fabrics forming the bag body and the reinforcing fabric secured around the periphery of the inflator fitting hole are superposed on each other and sewn together, with the yarn axes of the respective fabrics oriented in the same direction, and an opening for securing an inflator is provided on the yarn axis of the reinforcing fabric passing through the center of the inflator fitting hole or on a line parallel to said yarn axis.

* * * * *